(No Model.)

F. N. ETHRIDGE.
PISTON PACKING.

No. 484,188. Patented Oct. 11, 1892.

WITNESSES:
H. Brown
A. D. Harrison.

INVENTOR:
F. N. Ethridge
by Wright Brown Cromley
Attys.

UNITED STATES PATENT OFFICE.

FRANK N. ETHRIDGE, OF BOSTON, MASSACHUSETTS, ASSIGNOR OF ONE-THIRD TO GEORGE A. PETERSON, OF SAME PLACE.

PISTON-PACKING.

SPECIFICATION forming part of Letters Patent No. 484,188, dated October 11, 1892.

Application filed July 19, 1892. Serial No. 440,479. (No model.)

*To all whom it may concern:*

Be it known that I, FRANK N. ETHRIDGE, of Boston, in the county of Suffolk and State of Massachusetts, have invented certain new and useful Improvements in Piston-Packing, of which the following is a specification.

This invention has for its object to provide a durable and effective piston-packing which shall automatically expand to compensate for wear of its acting surface and of the inner surface of the cylinder on which it bears.

The invention consists in the improved packing, which I will now proceed to describe.

Figure 1:
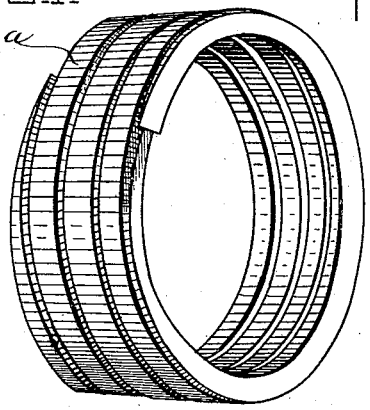
Figure 2:
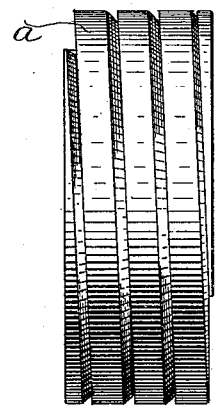
Figure 3:
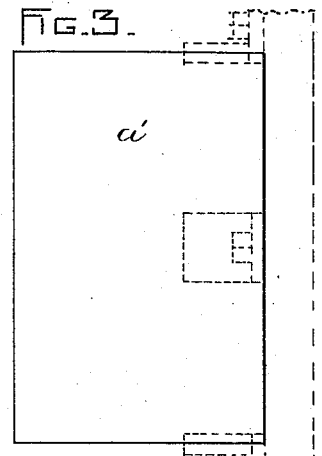
Figure 4:
Figure 5:
Figure 6:
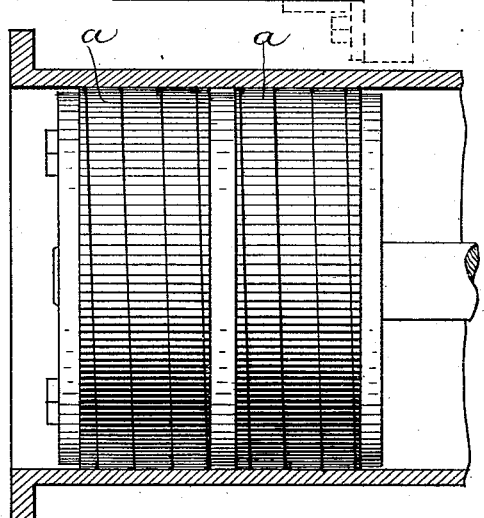
Figure 7:
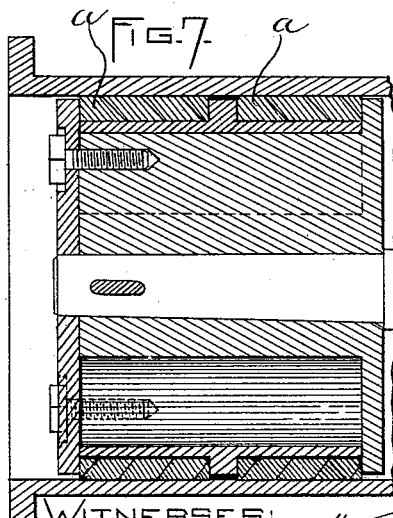
Figures 8, 9, 10:
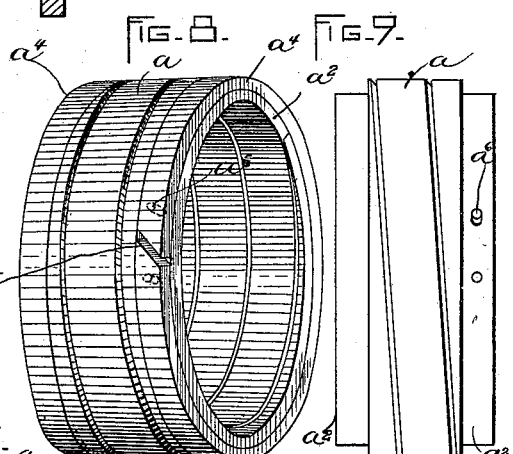

Of the accompanying drawings, forming a part of this specification, Figure 1 represents a perspective view of the helical strip from which my improved packing is made. Fig. 2 represents a side view of the same. Fig. 3 represents a side view of the tube from which said strip is cut. Fig. 4 represents the helical strip with its convolutions closed and compressed preparatory to the operation of turning the exterior surfaces of the convolutions to a true cylindrical form. Fig. 5 represents a similar view after the operation of turning said exterior surfaces. Fig. 6 represents a longitudinal section of a cylinder and a side view of a piston therein provided with my improved packing. Fig. 7 represents a longitudinal section of the cylinder and piston shown in Fig. 6. Figs. 8, 9, and 10 represent views showing a feature of my invention hereinafter described.

The same letters of reference indicate the same parts in all of the figures.

In carrying out my invention I make from any suitably resilient or springy metal, preferably steel or cast-iron, a helical strip $a$, the convolutions of which are normally open or separated, as shown in Figs. 1 and 2, so that when said convolutions are brought together, as shown in Figs. 4 and 7, they will have a constant tendency to separate. Said strip is best made by making a helical cut through a tube $a'$, Fig. 3, the width and direction of the cut being such that the remaining metal of the tube is left in the form of an open helix, as shown in Figs. 1 and 2, the sides of the helix being beveled, as shown in Fig. 7, for a purpose hereinafter described. I then wind said helical strip upon a mandrel or shaft in such manner as to close its coils and at the same time reduce the diameter of the helix, this being conveniently accomplished by attaching one end of the strip to a mandrel of smaller diameter than the interior of the helix and winding the strip closely upon the periphery of the mandrel and at the same time bringing its coils together, as shown in Fig. 4, the strip being firmly secured to the mandrel when closed and contracted thereon. The strip thus secured is a practically-continuous tube with a helical slit extending through it and formed with beveled sides. The next operation is to turn off the outer surface of said tube to a true cylindrical surface while it is confined as above stated, thus giving it a diameter which will fit the internal diameter of the cylinder in which it is to be used. Fig. 5 shows the strip after it has been closed and contracted and turned off.

As the ends of the packing are necessarily at right angles to the axis of the packing to conform to the heads of the piston, it is necessary to gradually reduce the width of the end convolutions, thus bringing the ends of the helix to a point. These points break the continuity of the ends of the packing and form an undesirable gap or recess. To obviate this objection, I provide each of the reduced portions of the convolutions with an outwardly-projecting flange $a^2$, which is gradually decreased in width from the outer end of the convolution on which it is formed. On said flanges I place the packing-rings $a^4$ $a^4$, which are of uniform width and supplement the helical strip, said rings being interposed between the end convolutions of the helix and the piston-heads. The rings $a^4$ are cut at $a^5$, the cut being preferably diagonal, so that they can expand and contract. Each ring is preferably engaged with the flange $a^2$, on which it is placed by a pin $a^6$, affixed to the ring and entering a hole in the flange. The packing is now completed and is ready for use on a piston $p$. When in use, it is confined between two flanges $p'$ $p'$ on the piston, the convolutions of the packing being held in contact with each other, or nearly so, by said flanges, which prevent the convolutions from moving laterally. The packing is free to expand, however, so that when the piston is inserted in the cylinder $q$ the periphery of the packing presses outwardly by the elasticity of the strip against the interior of the cylinder, thus maintaining a tight joint around the cylinder and compensating for wear of the surfaces of both the packing and cylinder. The beveled sides of the convolutions of the helical strip cause the convolutions to exert a wedge-like action on each other as they expand, and thus prevent any decrease in the width of the packing or any separation of its convolutions as it expands. The tapering form of the end convolutions would cause the collective width of the convolutions to decrease with their expansion, and thus widen the crevices between the convolutions, if the sides of the convolutions were at right angles with their outer surfaces, the tapered ends of the outer convolutions constituting wedges which are withdrawn by the expansion of the helix, and would thus be caused to loosen the intermediate convolutions but for the beveled form of the sides of the convolutions.

It will be seen that by making piston-packing of a single helical strip I avoid forming tongued and grooved and other joints which are required when the packing is made in two or more pieces, while by making the helix normally open and turning off its external surface to a true cylindrical form while the helix is closed and contracted to less than its normal diameter I enable the packing to accurately fit the interior of the cylinder and to set itself out automatically. I regard the step of turning off the exterior of the strip while it is in a compressed or contracted condition as one of much importance, since it insures a close and accurate fit, as well as the automatic expansion of the packing against the interior of the cylinder.

I prefer to provide two of the improved helical packing-strips for each piston, as shown in Figs. 6 and 7.

I do not limit myself to the employment of the flanges $a^2$ in all cases. In Figs. 1, 2, 3, 4, 5, 6, and 7 I show the helical packing made without said flanges and used without the rings $a^4$ $a^4$. The flanges and rings, however, make the packing much more durable, effective, and desirable.

I claim—

1. A helical packing-strip of resilient material, having a series of normally-open convolutions and presenting a true cylindrical periphery when said convolutions are closed and contracted, the end convolutions being tapered and the sides of all the convolutions, excepting the outer sides of the end convolutions, being beveled, substantially as and for the purpose specified.

2. A helical packing-strip of resilient material, having a series of normally-open convolutions and presenting a true cylindrical periphery when said convolutions are closed and contracted, the end convolutions being reduced in width and provided with outwardly-projecting flanges, combined with expansible packing-rings mounted on said flanges, as set forth.

3. A helical packing-strip of resilient material, having a series of normally-open convolutions and presenting a true cylindrical periphery when said convolutions are closed and contracted, the end convolutions being reduced in width and provided with outwardly-projecting flanges, combined with expansible packing-rings mounted on said flanges and a piston having heads or flanges between which said helical strip and rings are confined, as set forth.

In testimony whereof I have signed my name to this specification, in the presence of two subscribing witnesses, this 15th day of June, A. D. 1892.

FRANK N. ETHRIDGE.

Witnesses:
C. F. BROWN,
A. D. HARRISON.